US007343589B2

(12) United States Patent
Ringseth et al.

(10) Patent No.: US 7,343,589 B2
(45) Date of Patent: Mar. 11, 2008

(54) DECLARATIVE STATE SPACE REDUCTION IN A TRANSACTIONAL MESSAGING LANGUAGE

(75) Inventors: Paul F. Ringseth, Redmond, WA (US); Donald James McCrady, Redmond, WA (US); Bimal Mehta, Sammamish, WA (US); Paul Maybee, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 726 days.

(21) Appl. No.: 10/463,940

(22) Filed: Jun. 18, 2003

(65) Prior Publication Data

US 2004/0261066 A1 Dec. 23, 2004

(51) Int. Cl.
*G06F 9/44* (2006.01)
*G06N 5/00* (2006.01)

(52) U.S. Cl. ............... 717/126; 717/131; 717/140; 706/47; 706/57

(58) Field of Classification Search ............ 717/126, 717/131, 141
See application file for complete search history.

(56) References Cited

U.S. PATENT DOCUMENTS

| 5,615,137 | A | * | 3/1997 | Holzmann et al. ............ 703/17 |
| 5,615,369 | A | * | 3/1997 | Holler ........................ 717/158 |
| 5,758,163 | A | * | 5/1998 | Safonov ...................... 717/144 |
| 6,099,575 | A | * | 8/2000 | Hardin et al. ................. 703/22 |
| 6,154,876 | A | * | 11/2000 | Haley et al. ................ 717/133 |
| 6,553,362 | B2 | * | 4/2003 | Saxe et al. ..................... 706/47 |
| 6,823,507 | B1 | * | 11/2004 | Srinivasan et al. ......... 717/152 |
| 2003/0097652 | A1 | | 5/2003 | Roediger et al. ........... 717/160 |

OTHER PUBLICATIONS

Thatte, Satish. "XLANG Web Services for Business Process Design." Microsoft Corp., 2001. (Accessed on Aug. 18, 2006 from http://www.gotdotnet.com/team/xml_wsspecs/xlang-c/default.htm.).*

Horspool, R.N. et al., "Partial Redundancy Elimination Driven by a Cost-Benefit Analysis", *Computer Systems and Software Engineering*, 1997, 111-118.

Johmann, K.R. et al., "Context-dependent Flow-sensitive Interprocedural Dataflow Analysis", *Software Maintenance: Research and Practice*, 1995, 7, 177-202.

Mayer-Lindenberg, F., "A Model of Distributed Processes Suitable for Parallel Embedded Systems", *Proceedings of the IASTED Conference, Parallel and Distributed Computing and Systems*, 2000, 2, 728-734.

* cited by examiner

*Primary Examiner*—Tuan Dam
*Assistant Examiner*—Michael Yigdall
(74) *Attorney, Agent, or Firm*—Woodcock Washburn LLP

(57) ABSTRACT

A XLANG/s compiler recognizes a statement in XLANG/s code to make an assumption as to the success or failure of a specified transaction. The assignment states of variables are tracked and changes to such states are recorded. While processing XLANG/s code, the compiler determines whether the assignment state of a particular correlation, operation or the like is correct for the transaction being performed. If not, the compiler may generate an error message. Moreover, by using declarative assumptions such as if(succeeded(T)) or if(!succeeded(T)), definite-assignment analysis of shared state variables may cross transactional boundaries.

49 Claims, 7 Drawing Sheets

DECLARATIVE STATE SPACE REDUCTION IN A TRANSACTIONAL MESSAGING LANGUAGE

FIELD OF THE INVENTION

The present invention relates generally to computer software compilers. More particularly, the present invention relates to a XLANG/s compiler that declaratively reduces state space at compile time. Even more particularly, the present invention relates to detecting a statement relating to a transaction at compile time and performing flowgraph analysis to analyze the transaction with and without an exception occurring within the transaction.

BACKGROUND OF THE INVENTION

A business may use a web service to communicate with other entities via a distributed environment, such as the Internet or World Wide Web. To ensure that such an interaction is accomplished successfully, one or more protocols must be in place for carrying messages to and from participants, and specific business applications must be in place at each participant's end. Such interactions are message driven. For example, a buyer sends a purchase order to a seller. The seller then checks its inventory to determine if it can provide the ordered items. If so, the seller sends an acknowledgement back to the buyer with a price. Finally, the buyer accepts or rejects the seller's offer (and/or possibly places another order). As evident in this example, each participant's business application reacts to the receipt of messages. Also illustrated in this example is that these types of web service transactions may take place over long periods of time. For example, the seller may receive the purchase order from the buyer and may take a few days to evaluate its inventory prior to sending an acknowledgement. Further, each participant may conduct activities at its end, such as tracking messages and updating the status of each activity.

Software code that enables such interactions should be very robust to be able to accommodate the various methods for sending and receiving messages. In addition, the code should be properly written so that if an error occurs, the software will be able to react to, compensate for and/or otherwise accommodate the error. One method of detecting an error prior to running the program ("run time") is by generating one or more flowgraphs during compilation (at "compile time"). As should be known to those skilled in the art, a compiler converts the high-level code used by programmers into a machine-readable language that can be more quickly executed at run time. At compile time, a compiler maps out the different possible logic paths that may be taken by the program to create a flowgraph of such logic paths. The flowgraphs are used to determine whether the program will cause an illegal operation in one or more of the logic paths and, if so, the compiler generates an error message. The error message is preferably a specific description of the type of error encountered, as well as the position within the code where the error occurred. Such specificity is useful because it enables quicker and more precise debugging. If an error is not detected at compile time, the error may be encountered at run time and could therefore affect a real-world transaction. In some situations, errors at run time may occur silently, where the error does not cause a program failure but instead corrupts data. In other situations, the errors at run time may cause a program to fail (or "crash"), to malfunction or otherwise become inoperative.

Implementing business transactions, such as those described above, with software code causes unique situations to take place when running and/or compiling the code. In the example described above where the seller may take a few days to evaluate its inventory prior to sending an acknowledgement, the software must be able to account for a sent message that does not receive a response for a potentially long time. Such accounting may need to be performed for a large number of messages that are being sent to and received from numerous third parties, each of which may have different message protocols. Thus, it is particularly important to have robust, error-free software code to control such business transactions.

Unfortunately, a shortcoming of conventional compilers is that such compilers cannot recognize the problems that may occur as a result of programming for sending and receiving messages as described above. The sending and receiving of messages necessitates a variety of unique branching and variable assignment situations. Errors in such situations are either not recognizable to conventional compilers, or are recognizable as an error but the compiler is unable to precisely determine the type of error and therefore cannot provide a complete error message to the programmer. Thus, the programmer either does not know about the error, or knows about the error but does not know the location or type of error. As a result, programming effective and robust software code to implement business transactions becomes a more time and money-consuming process than would otherwise be necessary.

Accordingly, what is needed is a method and system for detecting the assignment states of variables in software code that is processing transactions. More particularly, what is needed is a method for writing a command into a program, such as an XLANG/s program, that indicates to a compiler that the compiler either should or should not assume a process to have successfully occurred. Even more particularly, what is needed is a method of recognizing the command, for performing a flow analysis of the program and, if applicable, outputting an appropriate error message.

SUMMARY OF THE INVENTION

In light of the foregoing limitations and drawbacks, a XLANG/s compiler is provided that recognizes a statement in XLANG/s code that indicates to the compiler that a first logic path should be processed as if an exception occurred, and that a second logic path should be executed as if an exception did not occur. The assignment states of variables are tracked and changes to such states are recorded. The variables involved may be correlations—which are part of a message transport infrastructure to maintain accountability of messages—request-response operations and the like. While processing XLANG/s code, the compiler determines whether the assignment state of a particular correlation, operation or the like is correct for the transaction being performed. If not, the compiler may generate an error message having details about the particular assignment state that is in error, the variable involved, the assumption that was made about the success or failure of the transaction and the like.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary embodiments of the invention; however, the invention is not limited to the specific methods and instrumentalities disclosed. In the drawings.

DETAILED DESCRIPTION OF ILLUSTRATIVE EMBODIMENTS

Overview

A XLANG/s compiler is provided that recognizes a statement in XLANG/s code to make an assumption as to the success or failure of a specified transaction in the code. The assignment states of variables, such as the variables associated with correlations, request-response operations and the like, are tracked and changes to such states are recorded. Correlations are part of a message transport infrastructure, and are used to maintain accountability of the messages that are sent and received in a business messaging environment. Request-response operations are message pairs that have a one-to-one correspondence between a request sent and a response received. The assignment states are typically stored in variables having a state of true, false or indeterminate. A state of true indicates that a variable has been assigned a value on a logic path. Likewise, a state of false indicates that a variable has not been assigned a value on a logic path.

A variable that is definitely assigned is assigned a value on any logic path, and a variable that is definitely unassigned is not assigned a value on any logic path. A state of indeterminate indicates that a variable that is definitely unassigned prior to a transaction, and is definitely assigned on all logic paths within such transaction, may or may not have been assigned if the transaction throws an exception. Such an occurrence results from, for example, long-running transactions. When an exception is thrown from a long-running transaction, it is not known whether any of the instructions within the transaction occurred. An exception may be thrown as a result of any type of fault-inducing occurrence, such as a power failure, communications fault and/or the like. A thrown exception is processed by an exception handler, which is software code designed for such an event.

While processing XLANG/s code, therefore, the compiler determines whether the assignment state of a particular correlation, operation or the like is correct for the function being performed. If not, the compiler may generate an error message having details about the particular assignment state that is in error, the variable involved, the assumption that was made about the success or failure of the transaction and the like.

Exemplary Computing Environment

Figure 1:
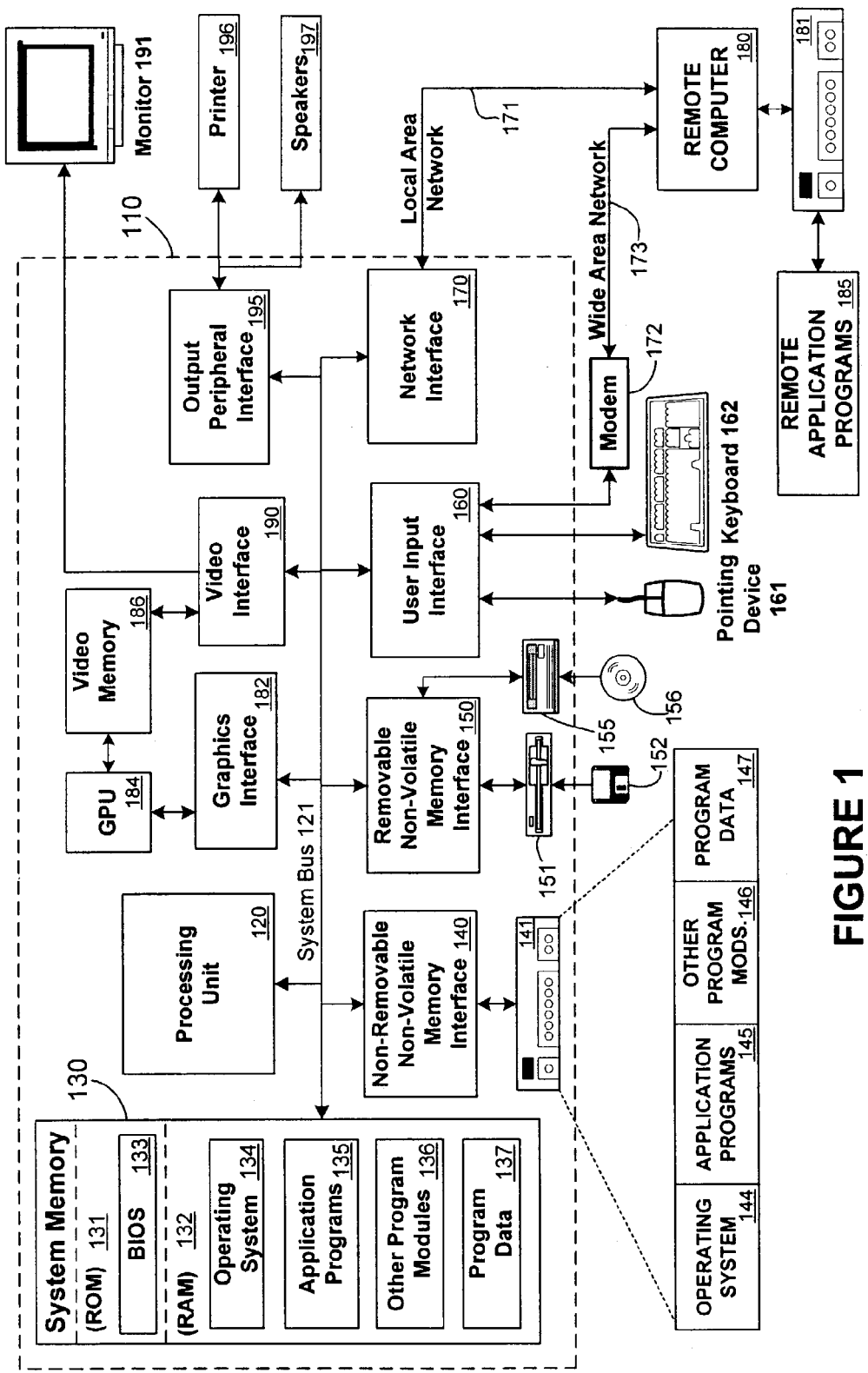
FIG. 1 is a block diagram showing an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/non-volatile computer storage media. By way of example only, FIG. 1 illustrates a hard disk drive 140 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Exemplary Distributed Computing Frameworks or Architectures

Various distributed computing frameworks have been and are being developed in light of the convergence of personal computing and the Internet. Individuals and business users alike are provided with a seamlessly interoperable and web-enabled interface for applications and computing devices, making computing activities increasingly web browser or network-oriented.

For example, MICROSOFT®'s .NET platform includes servers, building-block services, such as web-based data storage, and downloadable device software. Generally speaking, the NET platform provides (1) the ability to make the entire range of computing devices work together and to have user information automatically updated and synchronized on all of them, (2) increased interactive capability for web sites, enabled by greater use of XML rather than HTML, (3) online services that feature customized access and delivery of products and services to the user from a central starting point for the management of various applications, such as e-mail, for example, or software, such as Office .NET, (4) centralized data storage, which will increase efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors, and (7) many other cross-platform integration features as well.

While exemplary embodiments herein are described in connection with software residing on a computing device, one or more portions of the invention may also be implemented via an operating system, API, or a "middle man" object between a coprocessor and requesting object, such that services may be performed by, supported in, or accessed via all of NET's languages and services, and in other distributed computing frameworks as well.

EXEMPLARY EMBODIMENTS

Introduction to Web Services

Businesses are more frequently interacting via distributed environments, such as the Internet or World Wide Web. For example, a consumer may want to know the prices of rental cars for an upcoming trip. The consumer may request the prices through an intermediate business on the Internet, such as a travel website. The intermediate business, upon receiving the consumer's request, sends price quote requests to a variety of rental car businesses. After responses are received, the intermediate business then sends the responses to the consumer. The consumer may then reserve a car and pay for the reservation via the intermediate business. The business processes discussed above are implemented using messages. For example, the consumer's request to the intermediate business is implemented as an electronic message to the intermediate business that contains the particulars of the proposed car rental, for example: rental dates and times, type of car, additional insurance desired, consumer's name and address, credit card information and/or the like. The intermediate business' price quote request is another message, as are the responses from the rental car businesses—both to the intermediate business from the rental car businesses and from the intermediate business to the consumer—and the reservation ultimately sent by the consumer.

A computer language designed to automate business processes and the messages used to carry out such processes is XLANG/s, which is described in more detail, below. As may be appreciated, it is important that the processes that are implemented using XLANG/s execute properly, and without errors. In addition, such processes should be robust enough to compensate for external errors, such as communications link failures and the like. Providing a method of programming and compiling XLANG/s code to accomplish such processes in a robust and error-free manner is an application of an embodiment of the present invention.

XLANG/s Introduction

XLANG/s is a language that describes the logical sequencing of business processes, as well as the implementation of the business process by using various technology components or services. XLANG/s is described in more detail than is disclosed herein in a document titled "XLANG/s Language Specification," Version 0.55, Copyright© Microsoft Corporation 1999-2000, and a document titled "XLANG Web Services For Business Process Design, Satish Thatte, Copyright© Microsoft Corporation 2001, both of which are hereby incorporated by reference in their entirety. The XLANG language is expressed in Extensible Markup Language (XML). As noted above, business processes may be implemented using software code. The XLANG/s language is a modem, special purpose language used to describe business processes and protocols.

XLANG/s is also a declarative language, which means that it defines an explicit instruction set that describes and implements steps in a business process, the relationship between those steps, as well as their semantics and interactions. XLANG/s code is not just descriptive; it is also designed to be executable. Because of the declarative nature of XLANG/s and its specific semantics, the resulting executable code is deterministic; that is, the behavior of the running business process is well defined by the semantics of the collection of XLANG/s instructions. Therefore, by examining XLANG/s code one is able to determine the business process that is carried out by such code. The definition of such a business process in executable form is an "orchestration."

XLANG/s is compatible with many Internet standards. XLANG/s is designed to use XML, XSLT (http://www.w3.org/TR/xslt), XPATH (http://www.w3.org/TR/xpath), XSD (XML Schema Definition) and WSDL (Web Services Description Language) as supported standards and has embedded support for working with NET based objects and messages. WSDL is described in a document titled "Web Services Description Language (WSDL) 1.1," W3C Note January 2001, by Microsoft Corporation and IBM Research, Copyright© 2000 Ariba, International Business Machines Corporation and Microsoft Corporation, which is hereby incorporated by reference in its entirety. The XLANG/s language is syntactically similar to C#, thus a C# specification may be referenced as an aid to understanding the exact syntax. The semantics embodied in XLANG/s are a reflection of those defined in a document entitled "Business Process Execution Language for Web Services," Version 1.1, dated Mar. 31, 2003, published by Microsoft, IBM and BEA for the definition of Business Process semantics, which is also hereby incorporated by reference in its entirety. The Business Process Execution Language for Web Services specification is commonly referred to as the BPEL4WS specification. As may be appreciated, the use of XLANG/s is most advantageous when applied to a business process.

XLANG/s defines a rich set of high-level constructs used to define a business process. XLANG/s statements generally fall into one of two categories: simple statements that act on their own, such as receive or send, and complex statements that contain or group simple statements and/or other complex statements. XLANG/s also supports low-level data types such as string and int (integer), for example. High-level data types are also defined such as, for example, messages, ports (locations to which messages are sent and received), correlations and service links. The data types are used to rigorously define the semantics associated with the business process and are complemented by process control statements such as "while," and "scope."

As noted above, a XLANG/s service communicates with the outside world by sending and/or receiving messages. The message type is the structural definition of such a message. Messages are acted upon by operations (e.g., receive, response), and an operation may be either a single asynchronous message or a request-response pair of messages. Operations may be either incoming or outgoing. For example, a seller may offer a service/product that begins an interaction by accepting a purchase order (from a potential buyer) via an input message. The seller may then return an acknowledgement to the buyer if the order can be fulfilled. The seller may send additional messages to the buyer (e.g., shipping notices, invoices). Typically, these input and output operations occur in accordance with a defined sequence, referred to as a service process. The seller's service remembers the state of each purchase order interaction separately from other similar interactions. This is particularly advantageous in situations in which the buyer may be conducting many simultaneous purchase processes with the same seller. Also, each instance of a service process may perform activities in the background (e.g., update inventory, update account balance) without the stimulus of an input operation.

A service process may represent an interaction utilizing several operations. As such the interaction has a well-defined beginning and end. This interaction is referred to as an instance of the service. An instance can be started in either of two ways. A service can be explicitly instantiated using some implementation-specific functionality or a service can be implicitly instantiated with an operation in its behavior that is meant to be an instantiation operation. A service instance terminates when the process that defines its behavior terminates.

Services are instantiated to act in accordance with the history of an extended interaction. Messages sent to such services are delivered not only to the correct destination port, but to the correct instance of the service that defines the port. A port is an end point where messages are sent and received by a service. The infrastructure hosting the service supports this routing, thus avoiding burdening every service implementation with the need to implement a custom mechanism for instance routing.

Figure 2:
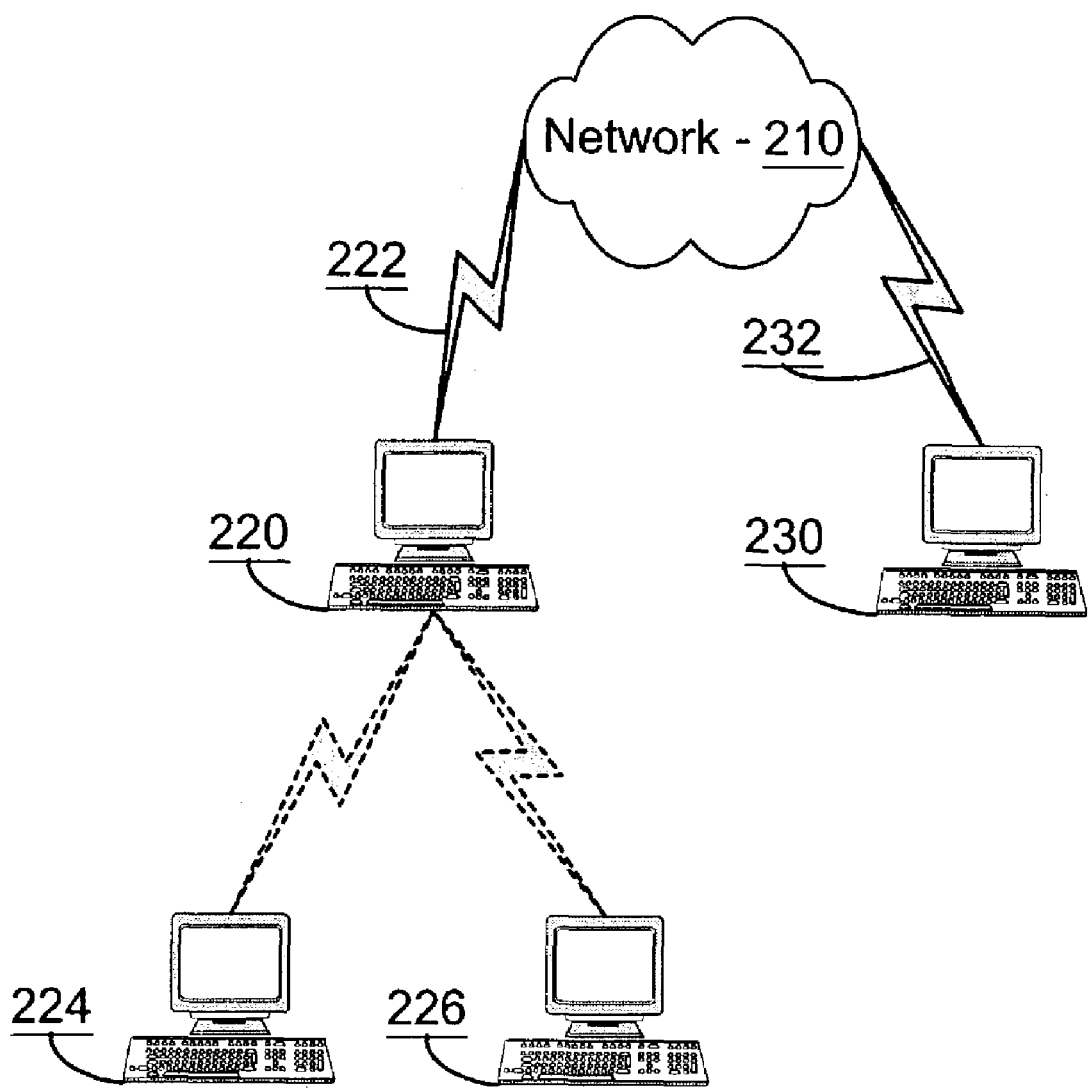
FIG. 2 is a block diagram showing an exemplary networked computing environment in which aspects of the invention may be implemented.

Turning now to FIG. 2, a simplified computer network for enabling communications between two business entities is illustrated. A first computer 220, which is any type of computing device such as, for example, computer 110 as disclosed above in connection with FIG. 1, a special-purpose computer or the like, is operatively connected to a network 210 by way of communications link 222. Network 210 may be any type of network for interconnecting a plurality of computing devices, and may be an intranet, the Internet, etc. Communications link 222 may comprise any type of communications medium, whether wired, wireless, optical or the like. Second computer 230, like first computer 220, may be any type of computing device, and is operatively connected to network 210 by way of communications link 232. Communications link 232, like communications link 222, may be any type of communications medium. In one embodiment, communications links 222, 232 are the same type of communications medium, while in another embodiment the medium employed by each communications link 222, 232 is different. Optionally, additional computers 224, 226 may be operatively connected to first computer 220. As may be appreciated, additional computers may be operatively connected to second computer 230 as well (not shown in FIG. 2 for clarity).

For example, consider a typical supply chain situation in which a buyer sends a purchase order to a seller. The buyer sends the message from, for example, first computer 220 to the seller's second computer 230 by way of the network 210 and communications links 222, 233. Assume the buyer and seller have a stable business relationship and are statically configured to send documents related to the purchasing interaction to the URLs associated with the relevant ports. When the seller returns an acknowledgement for the order, the acknowledgement is routed to the correct service instance at the buyer's end at computer 220 or, optionally, another computer such as additional computers 224, 226. One way to implement such a routing is to carry an embedded token (e.g., cookie) in the order message that is copied into the acknowledgement for correlation. The token may be in the message envelope in a header or in the business document (purchase order) itself. The structure and position of the tokens in each message can be expressed declaratively in the service description. This declarative information allows XLANG/s compliant infrastructure to use tokens to provide instance routing automatically.

During its lifetime, a service instance may typically hold one or more conversations with other service instances representing other participants involved in the interaction. Conversations may use a sophisticated transport infrastructure that correlates the messages involved in a conversation and routes them to the correct service instance. In many cases correlated conversations may involve more than two parties or may use lightweight transport infrastructure with correlation tokens embedded directly in the business documents being exchanged. XLANG/s addresses correlation scenarios by providing a very general mechanism to specify correlated groups of operations within a service instance. A set of correlation tokens can be defined as a set of properties shared by all messages in the correlated group. Such a set of properties is called a correlation set.

Features such as data types, tokens, correlation sets and the like are implemented in XLANG/s code using variables to store values necessary to carry out such features. As is the case with other high-level software languages, XLANG/s is compiled by a compiler prior to run time. A XLANG/s compiler recognizes that in some situations a variable within a program must be definitely assigned, or "initialized," prior to being used by the program. Otherwise, the program may, at run time, attempt to use a variable that has no value assigned to it, which could cause an error. Thus, such a compiler will present an error message if the compiler determines that the program would, at run time, attempt to use an unassigned variable. Such assignments are tracked by the compiler by maintaining a record of the definite assignment states of any or all of the variables within XLANG/s code that is being compiled. For example, the compiler maintains a register, or the like, of a second set of variables that correspond to the variables within the program. When a variable in the program is initialized, the definite assignment state is set to "true," which is stored in the corresponding variable in the second set. Thus, the compiler may refer to the definite assignment state at any point during compilation to determine whether a particular variable has been initialized.

Likewise, with respect to request-response messaging, such as that used to send messages between a buyer and seller as in the above examples, once a message is sent the definite assignment state of a variable representing the request-response message may be set to "true." Once the response is received, the definite assignment state may be reset to "false." Thus, in such a case, a XLANG/s compiler may determine that a particular initialization state is "false"—rather than true as discussed above—to maintain a one-to-one relationship between related requests and responses. In addition, in the case of correlations, a XLANG/s compiler must determine that a particular correlation has not already been initialized (initialization state is "false") prior to its initialization. In fact, the correlation must be definitely unassigned in such a case. Thus, a XLANG/s compiler may need to ensure that a particular variable's initialization state is either true or false, depending on the context of the transaction being performed by the XLANG/s code.

As may be appreciated, tracking the assignment states of all variables within a XLANG/s program may rapidly become a very difficult process, depending on the complexity of the particular program. Take, for example, a conditional branch caused by a statement such as an "if else" statement. If the condition specified in the "if" statement is met, then the program will follow a first logic path. If the condition is not met, the program will follow a second logic path as specified by the "else" statement. To prevent run time errors, the compiler must ensure that any variables that are used by the program after the "if else" statement are appropriately assigned or unassigned by the end of each logic path. Otherwise, the program may run successfully if, for example, the condition is met and the first logic path is followed, but will produce errors if the condition is not met and the second logic path is followed.

In addition, to implement the business process functionality discussed above, XLANG/s employs unique software code constructs and branches. A block of XLANG/s code that may provide such functionality is referred to as a "transaction." In the example provided above, for example, XLANG/s may need to provide functionality to enable a buyer to send a purchase order to a seller, and then wait for an acknowledgment. Errors, or exceptions, may occur at any point during the transaction such as, for example, while sending the purchase order, waiting for the acknowledgment or receiving the acknowledgment. Power failures to any of computers 220, 224, 226, 230 or the like, loss of communications connectivity—such as, for example, a failure at communications links 222, 232 or at network 210—and other such events may cause such exceptions. The XLANG/s software may comprise, for example, multiple branches for each of the possible exceptions that may occur, a dedicated exception handler—code that is designed to perform one or more tasks in the event of an exception—to handle exceptions that occur at one or more points in the XLANG/s software, or the like to process the exception.

In the context of the "if else" statement example given above, for example, an exception may occur at any point in either of the first or second logic paths. Therefore, a XLANG/s compiler not only preferably tracks the definite assignment states of the variables contained within the logic paths of a program as written; such a compiler also preferably tracks the definite assignment states of such variables while assuming that certain portions of such logic paths either successfully or unsuccessfully executed. In addition, because of the complexity a XLANG/s program may achieve, any definite assignment errors that are detected by a XLANG/s compiler should be specific enough to enable such a programmer to quickly and accurately repair any such errors in the code.

Accordingly, an embodiment provides a statement that, when inserted into XLANG/s code, indicates to a XLANG/s compiler that the compiler should treat a particular messaging transaction as either experiencing an exception, or as processing normally. The XLANG/s compiler then may process the code in the specified manner and may determine whether any definite assignment errors are present. If errors are present, the XLANG/s compiler may use information such as: type of statement, type of processing performed, location in the code of the error, the variable involved and the like, to generate a detailed error message to a programmer.

As may be appreciated, such a statement as provided by an embodiment may be any type of software statement that will be recognized by a XLANG/s compiler to generate the above-described effect, and any choice of syntax is consistent with such embodiment. In one exemplary embodiment the statement is: if(succeeded(n)), where n represents the identity of the transaction at issue. In one logic path following the if(succeeded) statement, the compiler will treat the transaction as not experiencing an exception and therefore processing normally. In doing so, the compiler will check the variable assignment states throughout each step of the transaction, assuming that each part completes successfully. In another logic path, the compiler will treat the transaction as experiencing an exception and therefore failing one or more steps of the transaction. At the end of both logic paths, the variable assignment states of each path are merged, and a final determination is made as to the validity of any variable reference that follows based on the merged variable assignment state. Thus, if a variable assignment error exists on either logic path—either when an exception was assumed to have occurred, or when the code transaction was assumed to have processed normally—the compiler will consider any reference to a variable having an improper assignment state in either logic path as being an error.

Therefore, the compiler will check the variable assignment states throughout the transaction, while assuming that any variable assignments that would have taken place in a step where an exception occurred did not in fact take place. In this way, the compiler is able to check for problems that may occur if the program attempts to access an unassigned variable in multiple branching logic paths of code, attempts to initialize an already-initialized correlation, attempts to send a request after the request has already been sent but before the response has been received and the like. In one exemplary embodiment, the compiler, upon determining that no errors are present in the code, compiles the code into a desired format such as, for example, machine language or the like.

Figure 3:
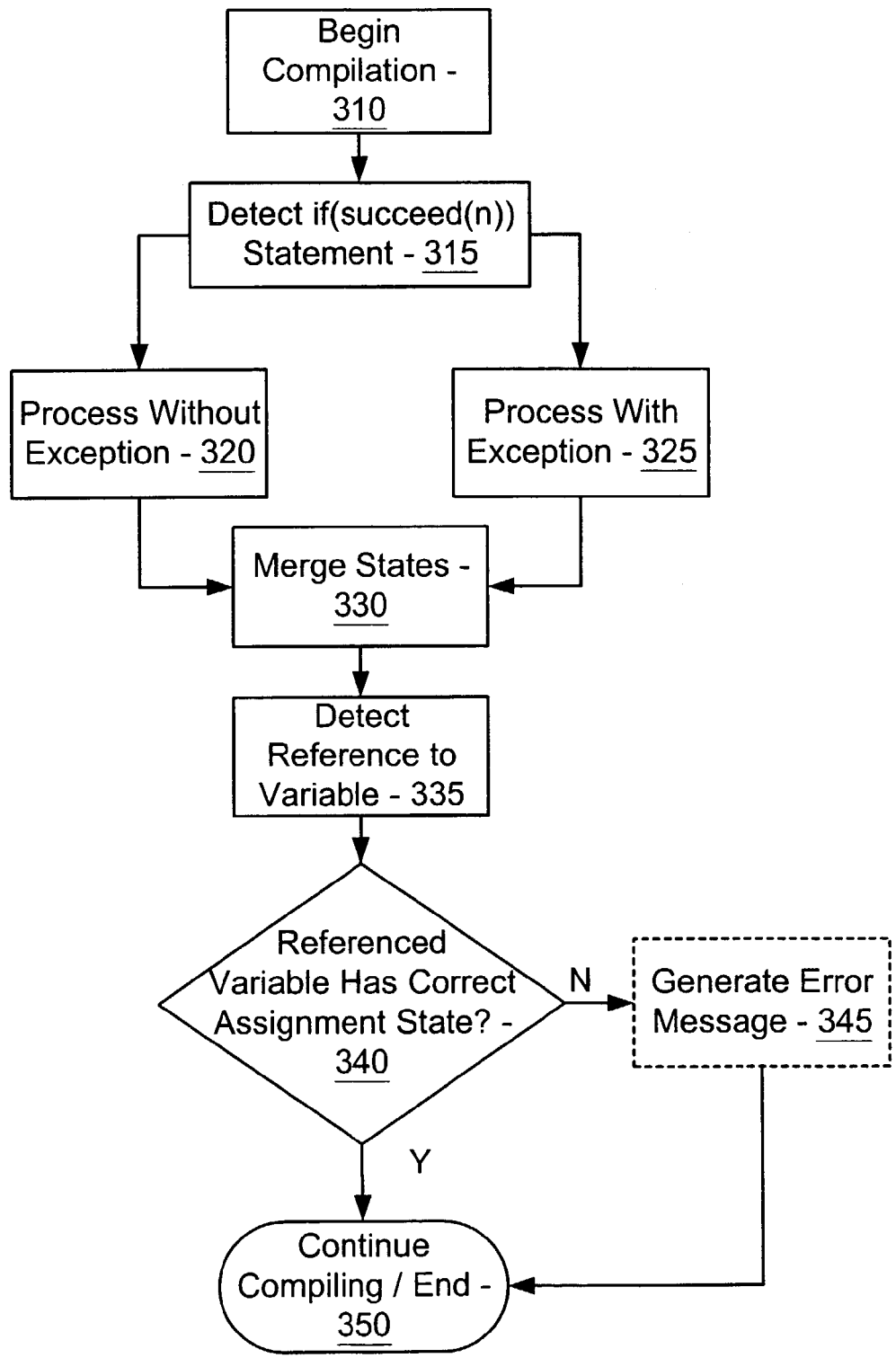
FIG. 3 is a flowchart showing a compilation process in accordance with one embodiment of the present invention.

A compilation process carried out in accordance with one embodiment is further explained with reference to FIG. 3. At step 310, the compilation process starts. As may be appreciated, step 310 may take place at the very beginning of a particular compilation process or as an intermediate step during such compilation. At step 315, the compiler detects an if(succeeded(n)) operator within the XLANG/s code, where n designates a transaction within such code. The compiler then branches into both steps 320 and 325. At step 320, the compiler processes transaction n as not having an exception, which involves processing transaction n as having all variable assignments within such transaction succeed. At step 325, the compiler processes the designated transaction n as having an exception. As discussed above, at step 325 the compiler processes transaction n without assuming any variable assignments that would otherwise occur within the transaction. As may be appreciated, if the transaction is atomic, no variable assignment is performed. As discussed above, the definite assignment states of variables may be stored in a second set of variables that correspond to the variables within the program.

At step 330, the compiler merges the assignment states generated by steps 320 and 325 into a final set of assignment states. At step 335, the compiler detects that a variable is being referenced by the code. As may be appreciated, such referencing is typically made by code that is outside—and typically afterwards in execution—the transaction, such as transaction n, where an assignment may have been made to such variable. At step 340, the compiler determines whether the referenced variable has a definite assignment state—as determined by the merged assignment states of step 330—equal to true or false. The proper assignment state, as noted above and as will be discussed in greater detail in connection with FIGS. 4-7, below, is dependent on the type of transaction being performed.

If the definite assignment state of such variable is incorrect, the XLANG/s compiler may generate an error message at optional step 345. As will also be discussed in connection with FIGS. 4-7 below, such error message may contain any type of information related to the error. For example, the error message may contain the location within the program where the improper reference occurred, the variable improperly referenced, the type of error, the if(succeeded(n)) statement involved and such statement's specification of true or false and/or the like. The reference to the if(succeeded(n)) statement's specification of true or false provides an indication to a XLANG/s programmer as to whether a particular transaction within the program was assumed to have succeeded or failed. Accordingly, the error message provides a programmer with detailed information with which to troubleshoot the program and determine a solution to the error.

After the error message is generated, the compiler proceeds to step 350, at which step the compilation process is either ended or continued. For example, the error message may be presented to the programmer as soon as such error is detected, in which case the compilation process may end at step 350. Alternatively, such error message may be consolidated with other error messages into a single, consolidated error message. In such an event, the compilation process will continue at step 350 until the entire program has been compiled. Likewise, presentation of such error message may be deferred until compilation of the entire program is complete.

If, at step 340, the definite assignment state of the variable is correct, the referencing operation is determined to be valid. Accordingly, the compiler continues to step 350, where the compilation process may continue, if more program remains to be compiled. Otherwise, the compilation process may end.

An embodiment may be better understood in conjunction with examples of XLANG/s code and the subsequent actions taken by a XLANG/s compiler at compile time. Thus, Table 1, below, presents simplified, exemplary XLANG/s code. There are three variables of interest in the code of Table 1: i, j and k. The initialization states of variables i, j and k are tracked by the XLANG/s compiler using, for example, three corresponding Boolean variables: bI, bJ and bK. As may be appreciated, the storage of initialization states in such variables may occur according to any naming or organizational convention, as the names and configurations of such variables as disclosed herein are solely for illustrative purposes. Therefore, any manner of storing initialization states and the like is equally consistent with an embodiment of the present invention. As noted above, when a given variable is initialized on a logic path the XLANG/s compiler sets a Boolean value of its initialization state to true. For any type of "if" statement branching, a variable must be initialized on every possible logic path to be considered initialized after the "if" statement. Otherwise, and as discussed above, whenever the program executes the one or more logic paths where the variable is not initialized, an error may occur. Thus, in a transaction having two possible logic paths as in the exemplary code of Table 1, there will be corresponding variables bI1, bJ1 and bK1 for the first path (the "if" path) and variables bI2, bJ2 and bK2 for the second path (the "else" path).

TABLE 1

| 1 | i = 15; |
|---|---|
| 2 | if (i > 14) { |
| 3 | j = 7; |
| 4 | k = 3; |
| 5 | } else { |
| 6 | i = 14; |

TABLE 1-continued

| 7 | k = 4; |
|---|---|
| 8 | } |
| 9 | i = k; |
| 10 | k = j; |

It is assumed herein that those of skill in the art should be familiar with the syntax of the exemplary XLANG/s code disclosed in Table 1. Therefore, a detailed explanation of such code is omitted herein for clarity. In addition, it may be appreciated that the line numbers in each of Tables 1-4 are for reference only, and are not part of the XLANG/s code.

A generalized process of compiling the XLANG/s code of Table 1 may be as follows. Referring now to Table 1, at line 1 the variable i is initialized, thereby causing its initialization state—stored in the variable bI—to be set to true. At line 2, i is referenced to determine whether i is larger than 14. Thus, at line 2, i must be initialized with a value to enable such a determination to be made. It can be seen that the "if" statement that uses i is valid, because bI is true. Starting at line 3, the current values of i, j and k (true, false, false) are copied to bI1, bJ1 and bK1 for the first branch (the "if" logic path) and to bI2, bJ2 and bK2 for the second branch (the "else" logic path). In the "if" logic path, at lines 3 and 4, the initialization states of j and k, respectively, are set to true because each are assigned a value. Therefore, at the conclusion of the "if" branch, the initialization states of i, j and k are (true, true, true). Accordingly, a reference to any of variables i, j and k that follow will be valid because each is assigned a value.

In the "else" logic path, starting at line 6, i is reassigned a new value, which causes bI2 to retain its initialization state of true. As may be appreciated, the value (true or false) of Boolean variables such as bI2 and the like are not dependent on the actual value of the variable whose initialization state is being tracked. Rather, the variable is concerned solely with whether its associated variable has any value assigned to it. At line 7, k is assigned a value, thereby causing the compiler to set bK2 to true.

At the conclusion of both logic paths, the compiler merges Boolean variables bI1, bJ1 and bK1 with bI2, bJ2 and bK2 to create new values for bI, bJ and bK. In doing so, only the states that are true in both branches will be set to true in bI, bJ and bK. Thus, bI, bJ and bK equals (true, false, true). At line 9, the compiler notes that i is being assigned the value of k. Because k has been definitely assigned, as indicated by the initialization state of true in bK, this is a valid instruction. However, at line 10, the compiler notes that k is being assigned the value of j. The initialization state of bJ is false, because j was not initialized in both branches of the "if else" statement—rather, j was only initialized in the "if" logic path. Thus, j has not been definitely assigned and the instruction of line 10 is invalid, thereby causing the compiler to generate an error as discussed above in connection with step 345 of FIG. 3.

Figure 4:
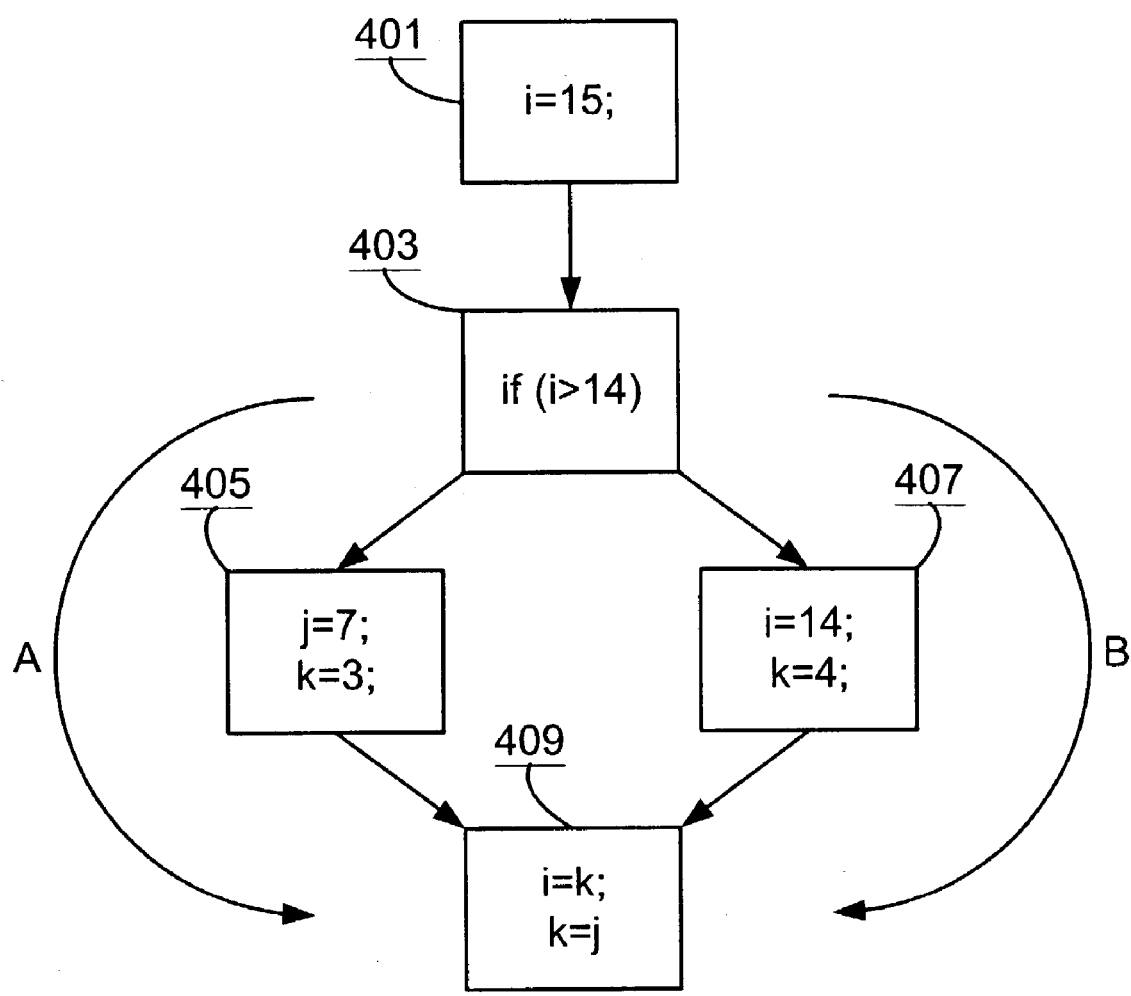
FIG. 4 is a block diagram showing an exemplary flowgraph of a long-running transaction in accordance with one embodiment of the present invention.

Referring now to FIG. 4, an exemplary flowgraph of the code of Table 1 is illustrated. One of skill in the art should be familiar with the use of flowgraphs in conjunction with compilers, and therefore a detailed description of such flowgraphs is omitted herein for clarity. Briefly, the flowgraph of FIG. 4 is a graphical representation of the analysis of an XLANG/s compiler of the XLANG/s code of Table 1 at compile time. Briefly, block 401 represents the code of line 1, and block 403 represents the "if" statement of line 2. Arrow A represents the "if" logic path that includes blocks 403, 405 and 409 and arrow B represents the "else" logic path that includes blocks 403, 407 and 409. Block 405 represents the code of lines 3 and 4, which are part of the "if" logic path of arrow A. Likewise, block 407 represents the code of lines 6 and 7, which are part of the "else" logic path of arrow B. Finally, block 409 represents the code of lines 9 and 10.

As noted above, exceptions may occur at any point during processing of XLANG/s code. Thus, during the compilation process the resilience of the code to such exceptions should be determined. In such a manner, the compiled XLANG/s code should be robust enough to continue successful processing in the event of such exceptions. In the code of Table 1, for example, an exception may occur in the transaction T at any point. Therefore, when compiling such XLANG/s code, the compiler cannot assume that any initialization that occurs in the transaction body is valid outside the transaction.

For example, if a particular variable is not initialized upon entering a transaction, but is initialized on every logic path in the body of the transaction, then upon exiting the transaction the XLANG/s compiler can neither assume such a variable to be definitely assigned nor can it assume the variable was not initialized on at least one logic path. Such a state may be referred to as a "Schrödinger's Cat" state—which is a reference to the classic thought experiment regarding indeterminate states. A XLANG/s compiler may track such an indeterminate state as an "indeterminate" state, thereby providing three possible initialization states for a variable: true, false and indeterminate. It should be noted that any such designation for an indeterminate state is consistent with an embodiment. It should also be noted that a variable that is not initialized on any logic path is referred to as being "definitely unassigned." As may be appreciated, a XLANG/s compiler that detects a reference to a variable that is in an indeterminate state cannot be assured that such variable has been assigned a value. Accordingly, a XLANG/s compiler that encounters such a reference will treat such reference as being an invalid instruction, in a manner similar to the compiler's treatment of a reference to a variable that has not been initialized. Thus the XLANG/s compiler assures a programmer that if no initialization errors are detected at compile time, the program will not have an initialization error at run time, regardless of the logic path actually taken.

According to one embodiment, and as discussed above, XLANG/s provides a if(succeeded(n)) operator. The if(succeeded(n)) operator is a declarative assertion that reduces state space by removing the possibility of an exception being thrown in the body of transaction n. Upon detecting an if(succeeded(n)) operator during the compilation process, the compiler assumes that the body of the transaction was executed without error, whereas with an if(!succeeded(n)) operator—effectively a "not succeeded" operator—the compiler assumes that an error has occurred. In the case of an atomic transaction the if(!succeeded(n)) operator is equivalent to removing or skipping the transaction completely.

TABLE 2

```
1   j = 22;
2   if (succeeded(T)){
4      j = i;
5   }
6   j = i;
```

Figure 5:
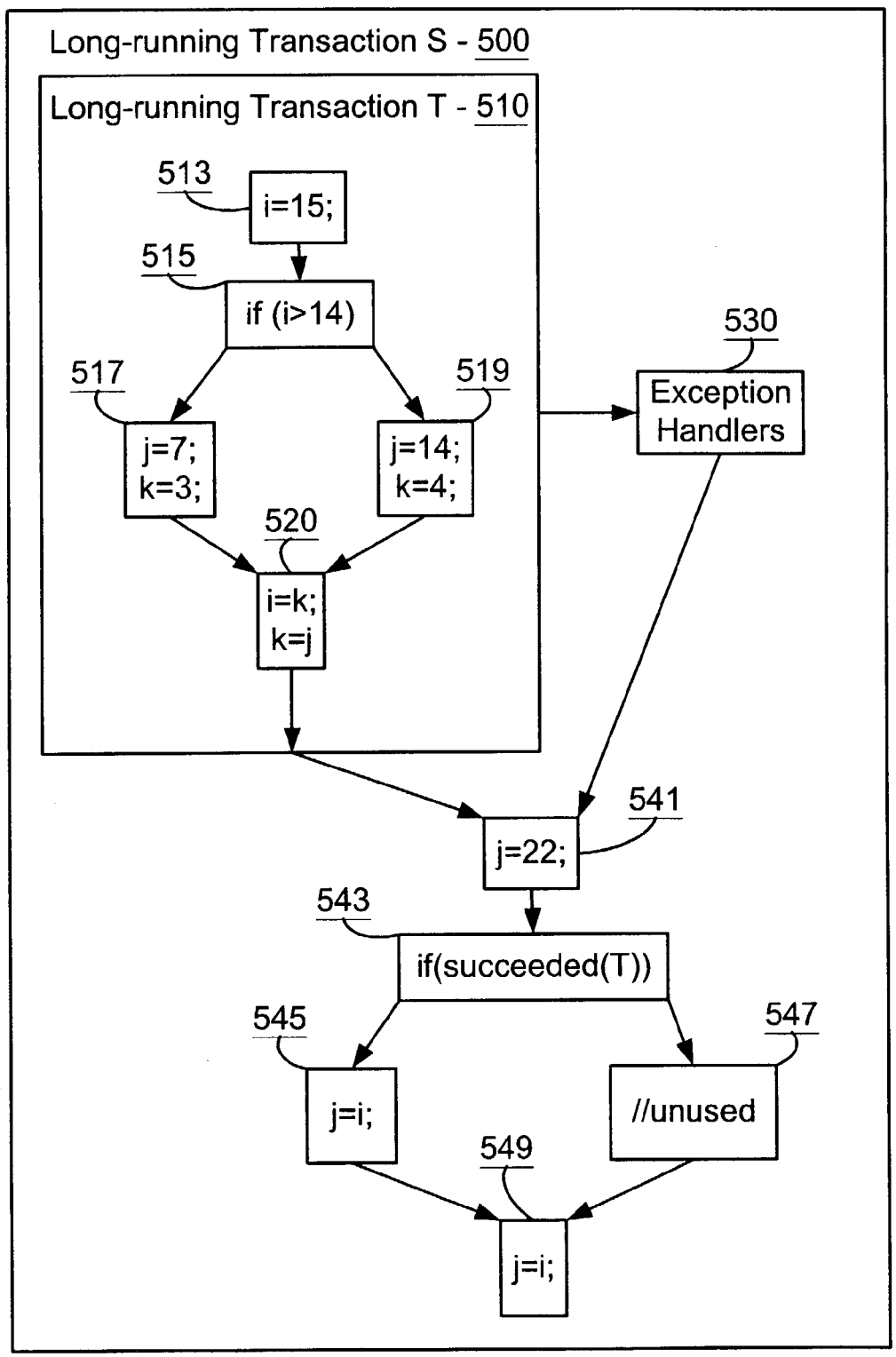
FIG. 5 is a block diagram showing an exemplary flowgraph of a long-running transaction nested within another long-running transaction in accordance with one embodiment of the present invention.

To illustrate the use of an if(succeeded(n)) operator, reference is made to the simple exemplary cod of Table 2, above. An exemplary flowgraph of an implementation of the code of Table 2 is shown in FIG. 5. As can be seen in FIG. 5, all of the code takes place within long-running transaction S 500. A long-running XLANG/s transaction is, as the name implies, a software transaction that takes place over a period of time that is significant for computing purposes. At any point during the processing of such a transaction, an exception may occur. When an exception is thrown from a long-running transaction, the compiler cannot be certain of which, or any, of the instructions within the transaction have executed successfully.

An alternate type of XLANG/s transaction is an atomic transaction. An atomic transaction is a software transaction in which no action takes place and no program state is changed unless the transaction successfully completes. It is atomic in the sense that it completes successfully or it does nothing at all, which is to say that it does not "commit." Therefore, a XLANG/s compiler may assume that none of the instructions within an atomic transaction have executed successfully if an exception is thrown from such transaction. Thus, the if(succeeded(n)) operator is of particular benefit for debugging transactions. Nested within long-running transaction S 500 is long-running transaction T 510. For clarity, the blocks 513-520 of long-running transaction T 510 are identical to blocks 401-409 of FIG. 4, with the exception that block 519 has been modified so that j is initialized, unlike in block 407 of FIG. 4, to avoid the assignment error encountered in FIG. 4.

The code of Table 2, including the if(succeeded(n)) operator, would typically be located after a corresponding transaction n, which in FIG. 5 is long-running transaction T 510. In addition, exception handler 530 is provided. Exception handler 530 is a block of code designed to detect when an exception has occurred and then take one or more predetermined actions. For example, in FIG. 5, if long-running transaction T 510 completes successfully, block 520 will complete and then lead directly to block 541; otherwise, exception handler 530 may detect that an exception has occurred while processing long-running transaction T 510 at some point while processing blocks 513-520, and will then direct processing to block 541. Block 543 contains the if(succeeded(T)) operator, and blocks 541, 545-549 contain additional code that, as will be seen, provide additional functions that may be determined by a programmer.

For the purposes of illustration, assume that a XLANG/s compiler has determined that, upon exiting long-running transaction T 510, the initialization states of i, j and k—as stored in bI, bJ and bK—are (false, false, false). Also, for clarity, the code of Table 2 will be referred to herein by way of the block 541-549 that contains such code in FIG. 5. The code of block 541 assigns a value to j and thereby changes the initialization states to (false, true, false). It should be noted that block 541 is an assignment that is made at a programmer's discretion, and any type of code is equally consistent with an embodiment. At block 543, the XLANG/s compiler encounters the if(succeeded(T)) statement. The compiler saves the assignment states that occur upon exiting long-running transaction T 510 into temporary variables as, for example, bIT, bJT and bKT, which are, according to the discussion above in connection with Table 1, (true, false, true). The compiler then merges the true elements of the two states (bI, bJ and bK; and bIT, bJT and bKT) to another set of temporary variables bI1, bJ1 and bK1 that results in values of (true, true, true). Thus, at block 545, the assignment of the value of i to j is valid because the initialization state of i is valid.

Code block 547 is used to make clear that an implicit else branch exists unless explicitly omitted. As may be appreciated, conditional statements such as "if" have an implicit branch for the case when the condition specified in the "if" statement or the like does not occur. Code block 547 is solely generated as part of a flowgraph and, as can be seen in Table 2, there is no code that corresponds to such an implicit branch, therefore the contents of code block 547 is noted as "unused." Therefore, the state of the implicit else branch is assigned the same initialization state as existed prior to the if(succeeded(T)) statement. Thus, temporary variables bI2, bJ2 and bK2 are assigned the states (false, true, false). Upon merging the common true states of bI1, bJ1 and bK1 with bI2, bJ2 and bK2, the result is stored in bI, bJ and bK as (false, true, false). Thus, the assignment of block 549 is invalid because i has not been initialized, and therefore the XLANG/s compiler will generate an error.

Table 3, below, relates to a context that has different initialization rules than the code of Tables 1 and 2. As discussed above, the initialization state of a correlation must be false prior to initializing the correlation. Otherwise, conflicting correlations may occur. Thus, unlike in the code of Tables 1 and 2, where the initialization of a variable must be definitely assigned (initialization state equal to true) prior to being referenced by the program, the initialization state of a correlation prior to its initialization must be false or, in other words, definitely unassigned. In addition, a XLANG/s compiler must ensure that there is no logic path in a program that may allow a correlation to be initialized more than once.

TABLE 3

```
1    module M {
2      using System;
3      correlationtype ct {
4        propOne, propTwo
5      };
6      porttype pt {
7        oneway o { String };
8      };
9      service longrunning transaction S {
10       correlation ct c1, c2, c3;
11       port implements pt p;
12       port uses pt pu;
13       message String m;
14       Boolean b;
15       body {
16         service longrunning transaction T {
17           body {
18             b = true;
19             construct m {
20               m = "Hello";
21             }
22             send(pu.o, m, initialize c1);
23             scope atomic transaction A {
24               body {
25                 receive(p.o, m, c1, initialize c2);
26                 receive(p.o, m, c2);
27               }
28             }
29             send(pu.o, m, initialize c3);
30           } exceptions {
31             catch {
32               if (!succeeded(A)) {
33                 receive(p.o, m, c1, initialize c2);
34               }
35             }
36           }
37         }
38         send(pu.o, m, c2);
39         if (succeeded(T)) {
```

TABLE 3-continued

```
40           receive(p.o, m, c3);
41         }
42         receive(p.o, m, c3);
43       }
44     }
45   }
```

Figure 6:
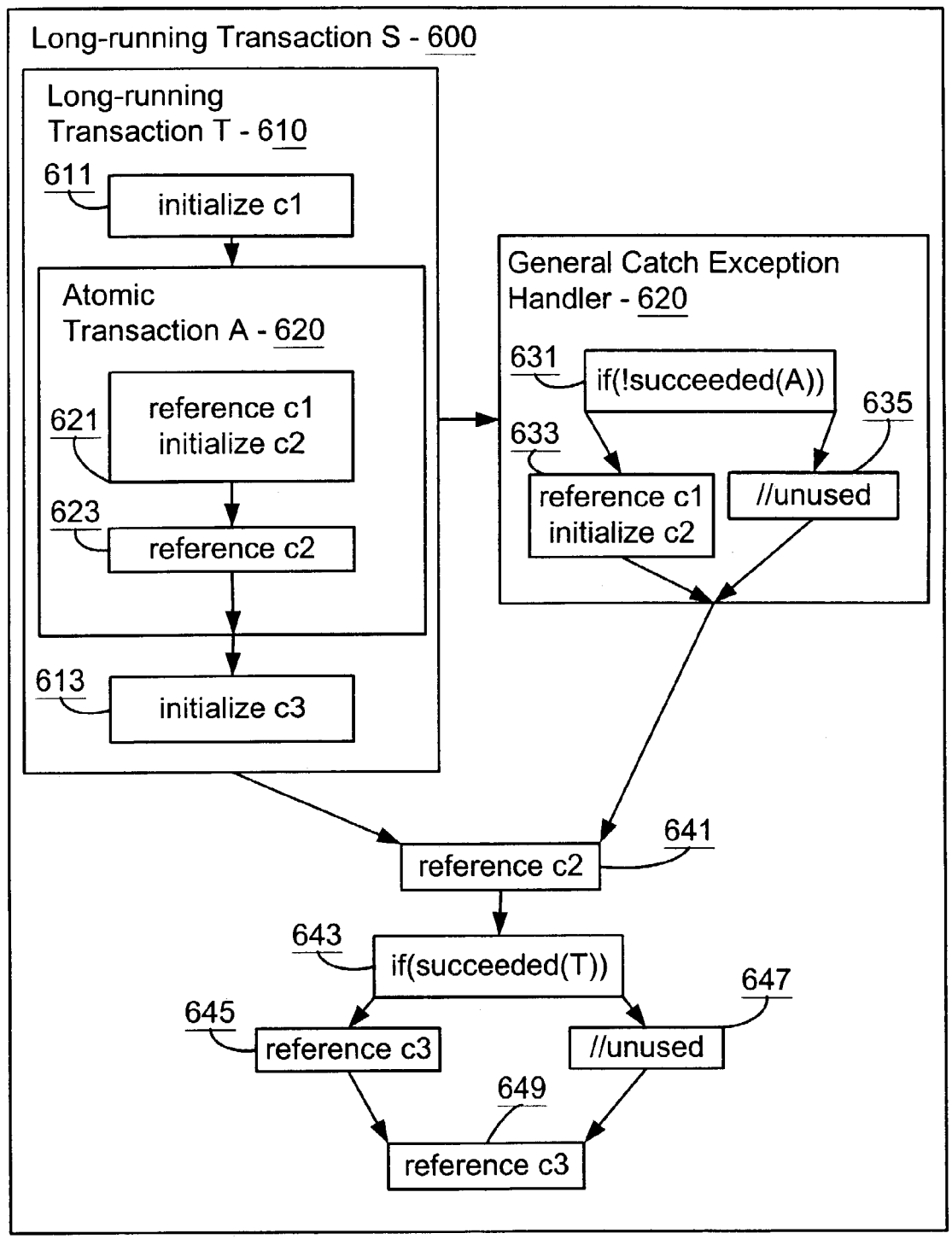
FIG. 6 is a block diagram showing an exemplary flowgraph of a correlation transaction in accordance with one embodiment of the present invention.

Turning now to FIG. 6, a XLANG/s compiler flowgraph representation of the code of Table 3 is shown. Long-running transaction S 600 contains long-running transaction T 610, which further contains atomic transaction A 620. General catch exception handler 620 executes when an exception is detected during code execution. As can be seen by reference to FIG. 6, the program flow of the code of Table 3 begins at long-running transaction S 600 and proceeds to block 611 and then to long-running transaction T 610. Within long-running transaction T 610, the program continues atomic transaction A 620. Within atomic transaction A 620 are code block 621 and 623. Finally, code block 613 executes before leaving long-running transaction T 610. At any point during long-running transaction T 610 an exception may be thrown, thereby initiating general catch exception handler 620. Within general catch exception handler 620 is code block 631 which will be followed by either of code blocks 633 or 635. Finally, either by leaving blocks 613 or one of 633 or 635, the execution will continue at block 641 to block 643. Blocks 645 or 647 will then execute, finally ending the execution of long-running transaction S 600 with block 649.

As noted above, the definite assignment state of a correlation at a given point within a program has three possible values: true, false or indeterminate. True is used when every logic path flowing into the given point has a state equaling true. Thus, only when a correlation has been initialized on every possible logic path leading to the given point within a program will the definite assignment state of such correlation at such point be equal to true. Conversely, false is used when every logic path flowing into this point results in a state equaling false. Indeterminate is used when at least one logic path results in a state equaling true and at least one logic path results in a state equaling false. Alternatively, indeterminate is also used when at least one logic path has a state equaling indeterminate. As noted above, to initialize a correlation, the correlation's definite assignment state must be false, so as to avoid initializing the same correlation more than once. In addition, to reference a correlation, the correlation's state must be true. The latter requirement is similar to that of the code of Tables 1 and 2, where a variable needed to be assigned a value before being referenced by the code.

Thus, at the beginning of long-running transaction S 600, it may be assumed that the definite assignment states of correlations c1, c2 and c3, stored in, for example, Boolean variables b1, b2 and b3 are (false, false, false). As may be appreciated, other transactions, if any, (not shown) that precede long-running transaction S 600 may initialize correlations c1, c2 or c3, which could cause the definite assignment states to be true or possibly indeterminate. However, for simplicity and the purposes of explanation it may be assumed that there are no other transactions in the code.

At block 611, correlation c1 is initialized, thereby changing the definite assignment states of b1, b2 and b3 to (true, false, false). Upon entering atomic transaction A 620, the same definite assignment states apply. At block 621, c1 is referenced. The compiler can determine that this is a valid instruction, because the definite assignment state, as discussed above in connection with block 611, is true. Also in block 621 correlation c2 is initialized, thereby causing the initialization states of b1, b2 and b3 to be (true, true, false) by the end of block 621. At block 623, c2 is referenced, which is a valid instruction because c2's definite assignment state, as recorded by b2, is true. After exiting entering atomic transaction A 620, and in block 613, c3 is initialized. This is a valid instruction because c3's definite assignment state, as recorded by b3, is false. Thus, upon exiting block 613 the initialization states of b1, b2 and b3 are (true, true, true).

If, at some point during the execution of long-running transaction T 610, an exception was thrown, general catch exception handler 620 is executed. Thus, a XLANG/s compiler must determine whether any definite assignment errors may take place during the execution of such handler 620. The definite assignment states of b1, b2 and b3 upon entering handler 620 are stored in an additional set of variables such as be1, be2 and be3. Such variables are set to (true, indeterminate, indeterminate) because it is unknown when the exception was thrown. Therefore, any correlation that is initialized within long-running transaction T 610 may or may not have occurred.

At block 631; however, the if(!succeeded(A)) statement—again, effectively a "not succeeded" statement—instructs the XLANG/s compiler to make a declarative assumption regarding atomic transaction A 620. Namely, the XLANG/s compiler, in the code of block 633, assumes that atomic transaction A 620 failed. Accordingly, the compiler may treat the atomic transaction A 620 as not having committed, which means that the instructions of blocks 620-623 never executed. The compiler at block 635 assumes that atomic transaction A 620 succeeded and therefore did commit. To proceed through each logic path—the path of block 633 and the path of block 635— the compiler makes a copy of be1, be2 and be3 for each logic path: l1, l2 and l3 for the path of block 633 and r1, r2 and r3 for the path of block 635.

Thus, upon entering block 633, the definite assignment states of l1, l2 and l3 are (true, false, indeterminate) and upon leaving block 633, after the reference to c1 and the initialization of c2, the assignment states are (true, true, indeterminate). At block 635, the states of r1, r2 and r3 are (true, true, indeterminate). As may be appreciated, this is the same set of definite assignment states for c1 and c2 that existed at the conclusion of block 613, because in the logic path of block 635 atomic transaction A 620 is assumed to have completed successfully. At the completion of blocks 633 and 635, the states of l1, l2, l3, r1, r2 and r3 are merged, thereby resulting in definite assignment states of be1, be2 and be3 equaling (true, true, indeterminate).

At the beginning of block 641, the definite assignment states at the end of block 613, b1, b2 and b3, and the merged assignment states at the end of blocks 633 and 635, be1, be2 and be3, are merged. Accordingly, at the beginning of block 641 the merged definite assignment states are (true, true, indeterminate). The reference to c2 is therefore valid because its corresponding definite assignment state, b2, is true. At block 643, the if(succeeded(T)) statement instructs the XLANG/s compiler to make a declarative assumption regarding long-running transaction T 610. Namely, the compiler, as was the case above with respect to blocks 631-635 and atomic transaction A 620, makes an assumption in block 645 that long-running transaction T 610 succeeded and makes another assumption in block 647 that long-running transaction T 610 failed.

At block 643, the XLANG/s compiler makes a copy of b1, b2 and b3 for the logic path of block 645 and stores the copy as l1, l2 and l3. For the logic path of block 647, a copy is made and stored in r1, r2 and r3. Thus, at block 645 l1, l2 and l3 equal (true, true, true), so the reference to c3 is valid. However, at block 647 r1, r2 and r3 equal (true, indeterminate, indeterminate). Accordingly, the reference to c3 in block 649 is invalid because the definite assignment state of c3 is indeterminate.

In Table 4, below, XLANG/s code is provided in an exemplary request-response messaging scenario. As noted above, in a request-response operation the polarity of the port is determined by which program service sends the request. In other words, a XLANG/s program performing a request-response operation first sends (or receives) a request to/from another service and then waits for (or sends) a response. Accordingly, on every logic path having a request in a given operation, there must also be exactly one corresponding receive for such operation. To send or receive a request, therefore, the definite assignment state of the operation must be false. Once the request is sent (or received), the assignment state is set to true, and is reset to false once the response is received (or sent). Code that calls for receiving (or sending) a response in an operation having a definite assignment state of false, or that attempts to send (or receive) a request in an operation having a definite assignment state of true, is invalid. In addition, code that calls for the program to exit an operation in a true definite assignment state, indicating that a request has been sent (or received) but no response has been received (or sent), is also invalid.

TABLE 4

```
1    module M {
2        using System;
3        porttype pt {
4            requestresponse o { String, String };
5        };
6        service longrunning transaction S {
7            message String m;
8            port uses pt p1;
9            body {
10               construct m { m = "Hello"; }
11               scope atomic transaction AT {
12                   body {
13                       send(p1.o, m);
14                   }
15               }
16               if (succeeded(AT)) {
17                   receive(p1.o, m);
18               }
19           } exceptions {
20               catch {
21                   if (!succeeded(AT)) {
22                       send(p1.o, m);
23                       receive(p1.o, m);
24                   }
25               }
26           }
27       }
28   }
```

Figure 7:
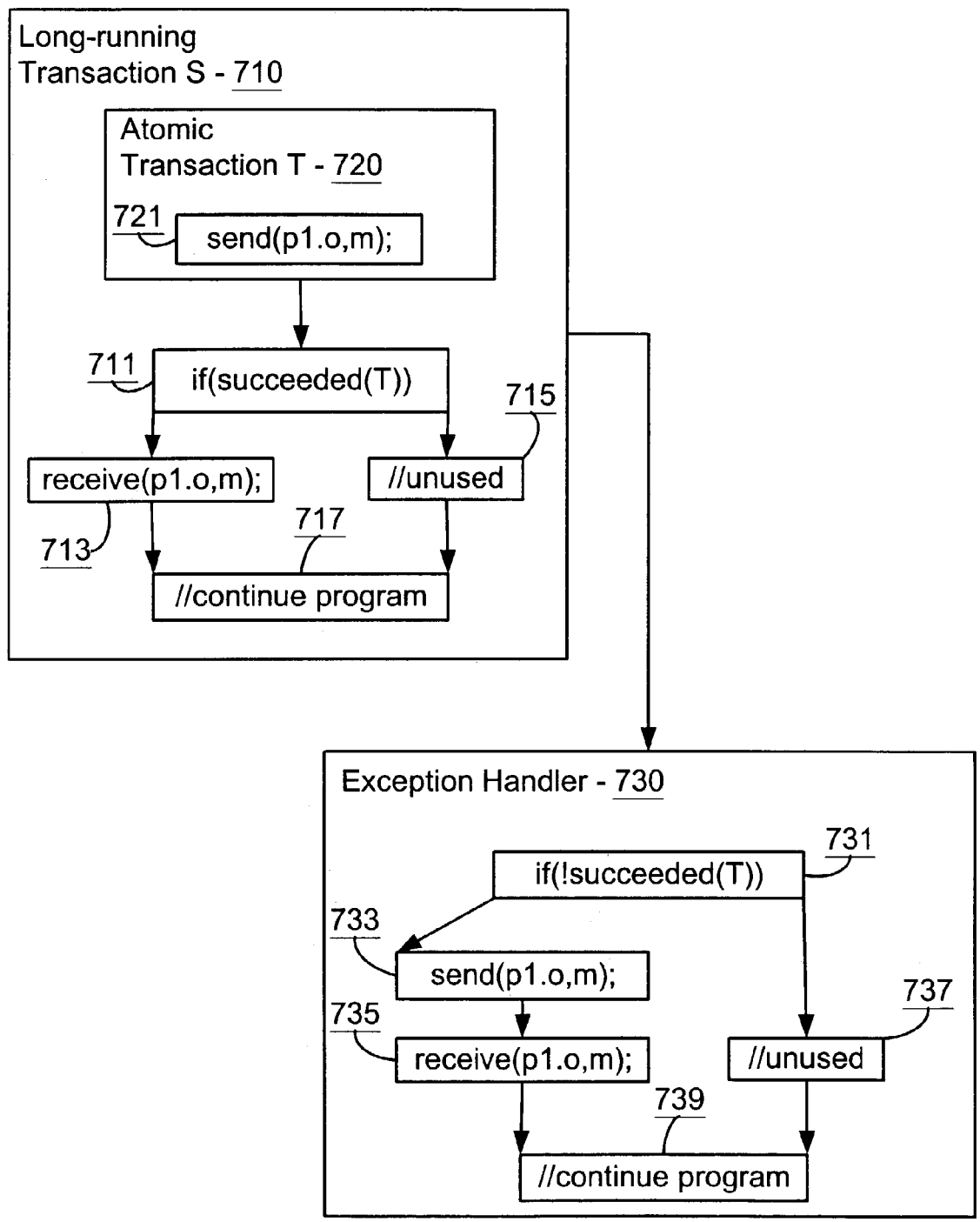
FIG. 7 is a block diagram showing an exemplary flowgraph of a request-response operation in accordance with one embodiment of the present invention.

An exemplary flowgraph of the code of Table 4 is illustrated in FIG. 7. Long-running transactions S 710 contains atomic transaction T 720 and blocks 711-717. Any of blocks 710-717 and 720-721 may throw an exception to exception handler 730, which contains blocks 731-739. The code of Table 4 is exited by the program by way of either block 717, if no exception occurs, or, in the event of an exception, by way of block 739.

In the present example, the definite assignment state of the operation p1.o at the beginning of long-running transaction S 710 is stored in Boolean variable b1 or the like. At block 721, within atomic transaction T 720, b1 is set to true because of the send instruction. At block 711, the if(succeeded(T)) instructs the XLANG/s compiler to make a declarative assumption regarding atomic transaction T 720. Namely, the compiler, as was the case above in connection with FIG. 6, makes an assumption in block 713 that atomic transaction T 720 succeeded and makes another assumption in block 715 that atomic transaction T 720 failed.

Thus, at block 713 the compiler, assuming that atomic transaction T 720 succeeded, determines that the receive on p1. o is valid because b1 is true. At the completion of block 713, b1 again equals false because of the receive. In block 715, the compiler assumes that atomic transaction T 720 failed—and therefore atomic transaction T 720 never committed—thereby keeping b1 at its original state of false. Therefore, leaving long-running transaction S 710 at block 717 is valid regardless of whether atomic transaction T 720 succeeded, because the value of b1 is false in either event.

If for some reason an exception occurred, exception handler 730 would be activated. Therefore, the XLANG/s compiler must determine that the definite assignment state of operation p1. o is valid if handler 730 is invoked at run time.

At exception handler 730, the atomic transaction T 720 is queried to determine if such transaction 720 failed. If so, the if(!succeeded(T)) ("not succeeded") instruction of block 731 causes a branch to the logic path of blocks 733 and 735. If such query indicates that transaction 720 succeeded, then a branch to the logic path of block 737 is caused. At block 733 a backup request is sent on p1. o, thereby causing b1, which equals false entering block 733 because of the assumed failure of transaction 720, to now equal true. At block 735 a receive is encountered on p1. o. The receive is valid because b1 is equal to true, and at the end of block 735 b1 is reset to false. Therefore at both blocks 717 and 739 b1 equals false and, as a result, the instructions are valid.

As noted above, an atomic transaction is either assumed to have succeeded or failed in its entirety. Conversely, a long-running transaction that throws an exception may or may not have completed any of the instructions contained therein—thereby generating the "Schrödinger's Cat" situation described above. To illustrate some of the complexities incurred with long-running transactions, particularly in an exemplary request-response analysis, assume henceforth that transaction T 720 is a long-running transaction. The difference in compile time processing is that if long-running transaction T 720 fails it is unknown whether the enclosed send at block 721 occurred or not. Therefore it must be assumed by the compiler that at block 711 b1 is equal to indeterminate. However, at block 713 the ambiguity is resolved in favor of b1 equaling true—because, as mentioned above, on this logic path transaction T 720 is assumed to have succeeded—and thus the receive at 713 is legal and resets the definite assignment state of b1 back to false. However, the definite assignment state of b1 on the logic path involving block 715 is still indeterminate. Assuming that transaction 720 failed does not resolve the ambiguity because the transaction 720 commits regardless of whether it succeeds or not. Thus merging the two branches at block 717 we still have b1 equaling indeterminate in one logic path and therefore an error occurs.

Within exception handler 730, at block 733, an additional problem is encountered. As noted above, at block 733 an assumption is made that transaction 720 failed, but at block 733 the value of b1 is equal to indeterminate. Because b1 does not equal false, the send in block 733 is invalid. Proceeding to block 735, b1 does not equal true (it still equals indeterminate) and so the receive in block 735 is also an error. The definite assignment state of b1 upon exiting exception handler 730 is equal to indeterminate, which therefore is another error. Accordingly, the XLANG/s compiler could generate an error message indicating that errors are encountered, at which blocks such errors are encountered, the assumptions made regarding the success or failure of atomic or long-running transactions, the value of b1 at the time of the error, and the like. As noted above, the explanatory error details provided by a compiler in one embodiment of the present invention enable a programmer to more easily, quickly and accurately locate and repair errors in the program.

Ultimately, by correcting such errors, the program is made more robust and resistant to run time errors. More generally, succeeded analysis allows a programmer to take action based upon prior success or failure of transactions at disparate parts of a program. In fact, if(succeeded(T)) assumes a successful completion of a transaction T, such as transaction T 720, whereas if(!succeeded(T)) assumes that an exception has been thrown. Furthermore, when a transaction T is an atomic transaction, if(!succeeded(T)) assumes the transaction never committed, which is to say no line of code in the transaction ever executed. Moreover, by using such declarative assumptions, such as if(succeeded(T)) or if(!succeeded(T)), definite-assignment analysis of shared state variables may cross transactional boundaries.

Thus, a method and system for compiling XLANG/s code involving declarative state space reduction has been provided. While the present invention has been described in connection with the exemplary embodiments of the various figures, it is to be understood that other similar embodiments may be used or modifications and additions may be made to the described embodiment for performing the same function of the present invention without deviating therefrom. For example, one skilled in the art will recognize that the present invention as described in the present application may apply to any configuration of components in any type of application environment. Therefore, the present invention should not be limited to any single embodiment, but rather should be construed in breadth and scope in accordance with the appended claims.

What is claimed:

1. A computer-implemented method, comprising:

reading computer code comprising at least one variable and a code transaction;

detecting a statement within the code, the statement specifying the code transaction and a manner in which the specified code transaction is to be analyzed, and indicating that in a first logic path following from the statement an exception occurred in connection with the code transaction and in a second logic path following from the statement an exception did not occur in connection with the code transaction;

analyzing the specified code transaction in the manner specified in the corresponding statement and according to each logic path and determining an assignment state of the at least one variable in each of the first and second logic paths following from the statement;

merging the assignment state of the at least one variable as determined in the first logic path with the assignment state of the at least one variable as determined in the second logic path; and determining that a function is invalid if the function is performed within the code with respect to the at least one variable while the at least one variable has a merged assignment state being an incorrect assignment state, otherwise determining that the function is valid; and processing the computer code according to the determination.

2. The computer-implemented method of claim 1, wherein the method is implemented by a compiler.

3. The computer-implemented method of claim 1, wherein processing the computer code comprises compiling the computer code if the determination is that the function is valid.

4. The computer-implemented method of claim 1, wherein processing the computer code comprises generating an error message if the determination is that the function is invalid.

5. The computer-implemented method of claim 4, wherein the error message comprises an enor type and location of the error within the code.

6. The computer-implemented method of claim 4, wherein the error message identifies the merged assignment state of the at least one variable.

7. The computer-implemented method of claim 6, wherein the error message indicates the function that is performed within the code with respect to the at least one variable while the at least one variable has a merged assignment state being an incorrect assignment state.

8. The computer-implemented method of claim 1, wherein the statement is an if(succeeded) statement.

9. The computer-implemented method of claim 1, wherein the determination is made based on the function being a reference to the at least one variable and the incorrect assignment state being an unassigned or indeterminate state.

10. The computer-implemented method of claim 1, wherein the at least one variable is a correlation.

11. The computer-implemented method of claim 10, wherein the determination is made based on the function being an initialization of the correlation and the incorrect assignment state being true.

12. The computer-implemented method of claim 10, wherein the determination is made based on the function being a reference to the correlation and the incorrect assignment state being false.

13. The computer-implemented method of claim 10, wherein the determination is made based on the function being either an initialization or reference to the correlation and the incorrect assignment state being indeterminate.

14. The computer-implemented method of claim 1, wherein the at least one variable is a request-response operation.

15. The computer-implemented method of claim 14, wherein the determination is made based on the function being a send and the incorrect assignment state being true.

16. The computer-implemented method of claim 14, wherein the determination is made based on the function being a receive and the incorrect assignment state being false.

17. The computer-implemented method of claim 14, wherein the determination is made based on the function being either a send or a receive and the incorrect assignment state being indeterminate.

18. The computer-implemented method of claim 14, wherein the determination is made based on the function being leaving the processing of the request-response operation and the incorrect assignment state being either true or indeterminate.

19. The computer-implemented method of claim 1, wherein the code is XLANG/s.

20. The computer-implemented method of claim 19, wherein the method is implemented by a XLANG/s compiler.

21. A method of compiling a XLANG/s program, comprising:
(a) reading XLANG/s code comprising at least one variable, a code transaction and at least one of an if(succeeded(n)) statement or an if(!succeeded(n)) statement;
(b) detecting, using a XLANG/s compiler, the if(succeeded(n)) or if(!succeeded(n)) statement, where n denotes the code transaction, and where the if(succeeded(n)) or if(succeeded(n)) statement denotes a manner in which the denoted code transaction is to be analyzed, the if(succeeded(n)) statement indicating that in a logic path following from the statement an error did not occur in connection with the code transaction, the if(!succeeded(n)) statement indicating that in a logic path following from the statement an error did occur in connection with the code transaction;
(c) analyzing the denoted code transaction in the manner specified in the conresponding statement by assuming, if the if(succeeded(n)) statement was detected, that the code transaction executed without error or, if the if(!succeeded(n)) statement was detected, assuming that an error occurred with respect to the execution of the code transaction;
(d) determining an assignment state of the at least one variable according to the assumption of step (c); and
(e) determining whether a pending operation can be completed subject to the assignment state of the at least one variable determined in step (d); and
(f) if the pending operation cannot be completed, generating an enor message declaring the pending operation to be invalid and, if the pending operation can be completed, compiling the operation.

22. The method of claim 21, wherein the error message comprises an enor type and location of the invalid pending operation within the XLANG/s code.

23. The method of claim 21, wherein the error message identifies the at least one variable.

24. The method of claim 21, wherein the error message indicates the at least one variable as being referenced in the computer code while having the assignment state as determined in step (d) being an incorrect assignment state.

25. The method of claim 21, wherein the declaration of step (e) (f) is made based on the pending operation being a reference to the at least one variable and the assignment state determined in step (d) being an unassigned or indeterminate state.

26. The method of claim 21, wherein the at least one variable is a correlation.

27. The method of claim 26, wherein the declaration of step (f) is made based on the pending operation being an initialization of the correlation and the assignment state determined in step (d) being true.

28. The method of claim 26, wherein the declaration of step (f) is made based on the pending operation being a reference to the correlation and the assignment state determined in step (d) being false.

29. The method of claim 26, wherein the declaration of step (f) is made based on the pending operation being either an initialization or a reference to the correlation and the assignment state determined in step (d) being indeterminate.

30. The method of claim 21, wherein the at least one variable is a request-response operation.

31. The method of claim 30, wherein the declaration of step (f) is made based on the pending operation being a send and the assignment state determined in step (d) state being true.

32. The method of claim 30, wherein the declaration of step (f) is made based on the pending operation being a receive and the assignment state determined in step (d) state being false.

33. The method of claim 30, wherein the declaration of step (f) is made based on the pending operation being either a send or a receive and the assignment state determined in step (d) being indeterminate.

34. The method of claim 30, wherein the declaration of step (f) is made based on the pending operation being leaving the processing of the request-response operation and the assignment state determined in step (d) being either true or indeterminate.

35. A computer-readable storage medium having computer-executable instructions for performing a method of compiling a XLANG/s program, the method comprising:
  (a) reading XLANG/s code comprising at least one variable, a code transaction and at least one of an if(succeeded(n)) statement or an if(!succeeded(n)) statement;
  (b) detecting, using a XLANG/s compiler, the if(succeeded(n)) or if(!succeeded(n)) statement, where n denotes the code transaction, and where the if(succeeded(n)) or if(!succeeded(n)) statement denotes a manner in which the denoted code transaction is to be analyzed, the if(succeeded(n)) statement indicating that in a logic path following from the statement an error did not occur in connection with the code transaction, the if(!succeeded(n)) statement indicating that in a logic path following from the statement an error did occur in connection with the code transaction;
  (c) analyzing the denoted code transaction in the manner specified in the corresponding statement by assuming, if the if(succeeded(n)) statement was detected, that the code transaction executed without error or, if the if(!succeeded(n)) statement was detected, assuming that an error occurred with respect to the execution of the code transaction;
  (d) determining an assignment state of the at least one variable according to the assumption of step (c); and
  (e) determining whether a pending operation can be completed subject to the assignment state of the at least one variable determined in step (d); and
  (f) if the pending operation cannot be completed, generating an error message declaring the pending operation to be invalid and, if the pending operation can be completed, compiling the operation.

36. The computer-readable storage medium of claim 35, wherein the method further comprises generating an error message according to the declaration of step (f).

37. The computer-readable storage medium of claim 36, wherein the error message comprises an error type and location of the invalid pending operation within the XLANG/s code.

38. The computer-readable storage medium of claim 36, wherein the error message identifies the at least one variable.

39. The computer-readable storage medium of claim 36, wherein the error message indicates the at least one variable as being referenced in the computer code while having the assignment state as determined in step (d) being an incorrect assignment state.

40. The computer-readable storage medium of claim 35, wherein the declaration of step (f) is made based on the pending operation being a reference to the at least one variable and the assignment state determined in step (d) being an unassigned or indeterminate state.

41. The computer-readable storage medium of claim 35, wherein the at least one variable is a correlation.

42. The computer-readable storage medium of claim 41, wherein the declaration of step (f) is made based on the pending operation being an initialization of the correlation and the assignment state determined in step (d) being true.

43. The computer-readable storage medium of claim 41, wherein the declaration of step (f) is made based on the pending operation being a reference to the correlation and the assignment state determined in step (d) being false.

44. The computer-readable storage medium of claim 41, wherein the declaration of step (f) is made based on the pending operation being either an initialization or a reference to the correlation and the assignment state determined in step (d) being indeterminate.

45. The computer-readable storage medium of claim 35, wherein the at least one variable is a request-response operation.

46. The computer-readable storage medium of claim 45, wherein the declaration of step (f) is made based on the pending operation being a send and the assignment state determined in step (d) state being true.

47. The computer-readable storage medium of claim 35, wherein the declaration of step (f) is made based on the pending operation being a receive and the assignment state determined in step (d) state being false.

48. The computer-readable storage medium of claim 35, wherein the declaration of step (f) is made based on the pending operation being either a send or a receive and the assignment state determined in step (d) being indeterminate.

49. The computer-readable storage medium of claim 35, wherein the declaration of step (f) is made based on the pending operation being leaving the processing of the request-response operation and the assignment state determined in step (d) being either true or indeterminate.

* * * * *